United States Patent
Lee et al.

(10) Patent No.: US 7,142,718 B2
(45) Date of Patent: Nov. 28, 2006

(54) FAST PATTERN SEARCHING

(76) Inventors: Shih-Jong J. Lee, 15418 SE. 53rd Pl., Bellevue, WA (US) 98006; Seho Oh, 5025 145th Pl SE., Bellevue, WA (US) 98006; Donglok Kim, 25330 SE. 36th Ct., Issaquah, WA (US) 98105

( * ) Notice: Subject to any disclaimer, the term of this patent is extended or adjusted under 35 U.S.C. 154(b) by 841 days.

(21) Appl. No.: 10/283,380

(22) Filed: Oct. 28, 2002

(65) Prior Publication Data

US 2004/0081360 A1    Apr. 29, 2004

(51) Int. Cl.
  *G06K 9/62*  (2006.01)
  *G06K 9/54*  (2006.01)
(52) U.S. Cl. .................................. 382/209; 382/305
(58) Field of Classification Search ................ 382/170, 382/181, 209, 218, 294, 305
  See application file for complete search history.

(56) References Cited

U.S. PATENT DOCUMENTS

| | | | |
|---|---|---|---|
| 5,442,715 A * | 8/1995 | Gaborski et al. | 382/187 |
| 5,526,444 A * | 6/1996 | Kopec et al. | 382/233 |
| 5,790,702 A * | 8/1998 | Yoshimura | 382/209 |
| 5,835,622 A * | 11/1998 | Koljonen et al. | 382/146 |
| 6,272,247 B1 | 8/2001 | Manickam et al. | |
| 6,282,326 B1 * | 8/2001 | Lee et al. | 382/289 |
| 6,633,655 B1 * | 10/2003 | Hong et al. | 382/118 |
| 6,640,008 B1 * | 10/2003 | Lee et al. | 382/218 |
| 6,941,016 B1 * | 9/2005 | Wagman et al. | 382/199 |

FOREIGN PATENT DOCUMENTS

JP    282195    * 10/1995
JP    09-102039    4/1997

OTHER PUBLICATIONS

Muramatsu, et al. "An image pattern search method based on DP matching for detecting accurate pattern positions"systems and computers in Japan, vol. 29, No. 4, pp. 22-32, 1998.*
Yoshimura, et al. "Fast template matching based on the normalized correlation by using multiresolution eigenimages", IEEE, pp. 2086-2093, Sep. 1994.*
Computer English Translation of Japanese patent No. 07-282195, publication date 1995, pp. 1-21.I.*
Silver, B, "Geometric Pattern Matching for General-Purpose Inspection in Industrial Machine Vision", Intelligent Vision '99 Conference—Jun. 28-29, 1999.
Korsheed, M et al, "Multi-font Arabic Word Recognition Using Spectral Features", Sep. 7, 2000 IEEE Proceedings ISBN:0-7695-0750, vol. 4, pp. 543-546.
Korsheed et al, "Spectral Features for Arabic Word Recognition", Jun. 9, 2000, IEEE Proceedings, ISBN: 0-7803-6293, vol. 6, pp. 3574-3577.

* cited by examiner

Primary Examiner—Daniel Mariam

(57) ABSTRACT

An accumulation transformation method for fast pattern search accurately locates general patterns of interest. The method can be used for fast invariant search to match patterns of interest in images where the searched pattern varies in size or orientation or aspect ratio, when pattern appearance is degraded, when the pattern is partially occluded, where the searched image is large, multidimensional, or very high resolution, or where the pattern size is large. The accumulation transformations of the input image are determined based upon the searched projection directions. Projection profile result images are derived from the accumulation transformed input image and used for fast matching with template pattern projection profiles.

10 Claims, 6 Drawing Sheets

FAST PATTERN SEARCHING

TECHNICAL FIELD

This invention relates to a method for fast pattern searching of an image.

BACKGROUND OF THE INVENTION

Pattern search is a simple yet powerful machine vision tool. Given a template pattern and an image, the pattern search objective is to find all instances of the pattern in the image. It involves two steps, a search step and a matching step. The search step places the pattern at all valid locations, scales, rotations of the image being searched. The matching step determines the goodness of the match between the pattern and the subset of the image centered at a given image location. A normalized correlation method (Ballard D H and Brown C M, "Computer Vision", Prentice-Hall Inc. 1982, pp. 68–70) has been widely used as the matching method in many machine vision applications because the match score of normalized correlation is largely independent of linear variations in object shading caused by reflectivity or illumination variation. However, pattern search based on the normalized correlation method is inherently computationally demanding since it requires operations between two (pattern and image) regions on all valid image locations. Even with the state-of-the-art computers, it is still difficult to achieve real-time performance when the image is large or frequent (for tracking) or includes color or 3D (or higher dimensionality). Furthermore, normalized correlation does not work well when the pattern being searched is subject to rotation or size variation. The match score could drop significantly even with only a few degrees of rotation or a few percent of size change occurring.

One prior art approach to rotation and scale invariance is to rotate and scale the pattern template and try all possible scale and rotation combinations. However, this imposes an even greater computational demand that cannot be accomplished using prior art methods. Another prior art approach is the use of a geometric pattern matching method such as PatMax introduced by Cognex (Silver, B, "Geometric Pattern Matching for General-Purpose Inspection in Industrial Machine Vision", Intelligent Vision '99 Conference—Jun. 28–29, 1999). This approach uses geometric information in place of pixel grid-based correlation. For example, it interprets a square as four line segments and a football as two arcs. It extracts key geometric features within an object image such as boundary encoding and measures characteristics such as shape, dimensions, angle, arcs, and shading. It then corresponds the spatial relationships between the key features of the pattern template and the new image. However, this prior art approach requires high edge contrast and low noise between patterns and background to reliably extract the key geometric features. It fails when edges of a pattern are not well defined. This is the inherent problem when using a geometric approach in place of a pixel grid based approach.

A recent change to the prior art approach has been disclosed in the U.S. patent application Ser. No. 10/255,016 filed Sep. 24, 2002 by Lee et. al entitled, "Fast Regular Shaped Pattern Searching" which is incorporated in its entirety herein. The patent application describes use of an accumulation transformation of an input image to facilitate fast search for regular shaped patterns. The invention is distinguished from this prior art by the fast search for general shaped patterns, which is done with different methods.

OBJECTS AND ADVANTAGES

It is an object of this invention to provide fast scale and aspect ratio invariant pattern search in an input image for general shaped patterns. An advantage of the invention is that the computation requirement for the accumulation transformation of the input image step of this invention is independent of the size of the pattern. The invention facilitates fast rotation invariant search. When done on the input image, the accumulation transformation only needs to be performed once for each angle. Alternatively, the rotation can be done on the template and the accumulation transformation is only done once. This represents significant saving compared to the prior art approach that searches rotation at each of the separate regions of the input image. The invention is especially efficient when multiple template patterns are searched simultaneously since only one accumulation transformation of an input image could support the construction of many different projection profiles. Furthermore, a multi-resolution coarse to fine search approach can be used to further increase the search speed. In this approach, wide search ranges are applied only at the lower resolution images and fine-tuning search is applied at higher resolution images. This efficiently achieves wide search range and fine search resolution. A further objective of this invention is to reduce cost and system complexity and thereby allow software implementation of the fast search method in a general computer platform without any special hardware.

SUMMARY OF THE INVENTION

A fast projection profile construction method receives an input image and performs an accumulation transformation of that input image to produce an accumulation transformed image. The accumulation transformed image is used to produce projection profile images according to a template pattern shape. Different directions of projection of the template pattern correspond to projection profile images determined from the corresponding accumulation transformed input image. The projection profile images are searched using the template projections to determine match results.

BRIEF DESCRIPTION OF THE DRAWINGS

The preferred embodiment and other aspects of the invention will become apparent from the following detailed description of the invention when read in conjunction with the accompanying drawings which are provided for the purpose of describing embodiments of the invention and not for limiting same, in which.

DETAILED DESCRIPTION OF THE INVENTION

I. Application Scenarios

Figure 1:
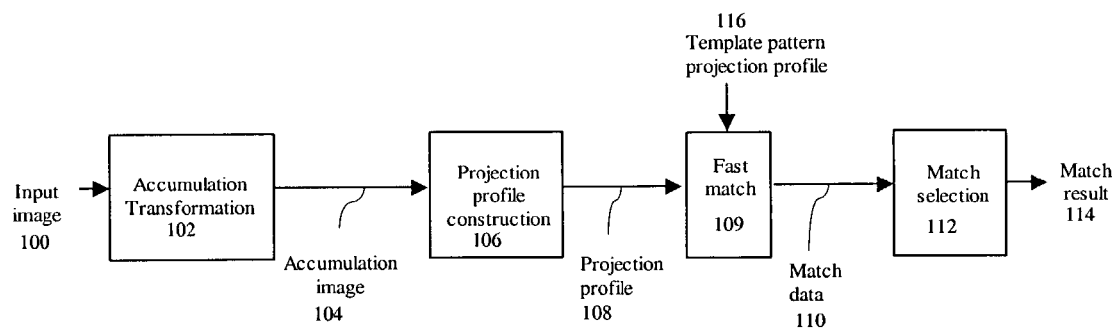
FIG. 1 shows fast pattern search processing flow.

The application scenario of this invention for pattern search is shown in FIG. 1. The input image 100 is processed by an accumulation transformation step 102 to create at least one accumulation image 104. Projection profiles 108 are constructed using the accumulation images by a projection profile construction step 106 having at least one projection profile output 108. The input image projection profiles 108 and the template patterns projection profile 116 are compared by a fast match step 109. The fast match step creates match data output 110. The match data is processed by a match selection step 112 to find good match locations and match score that constitute a match result 114. For invariant pattern matching, the pose (rotation angles, scales and aspect ratios) corresponding to the match locations can be included as part of the match result.

The invention is especially efficient when multiple template patterns are searched simultaneously since only one accumulation transformation could support the construction of many different projection profiles. This achieves greater saving than the search of each pattern independently since the overhead of the accumulation transformation is nearly fixed. Furthermore, the same accumulation transformation step supports multiple scale and aspect ratio searches. This is achieved by constructing projection profiles of different scales and aspect ratios using the same accumulation image. It does not require different accumulation transformation steps for different scales and aspect ratios. This is another great saving that is achieved by this invention. To support rotation invariance, the accumulation transformation can be performed for different rotation angles. Alternatively, the same accumulation transformation can be applied to different rotated input images within the expected range of rotation. Since accumulation transformation only needs to be performed once for each angle, this represent significant saving compared to the prior art approach that searches rotation of each of the separate regions of the image.

Figure 2:
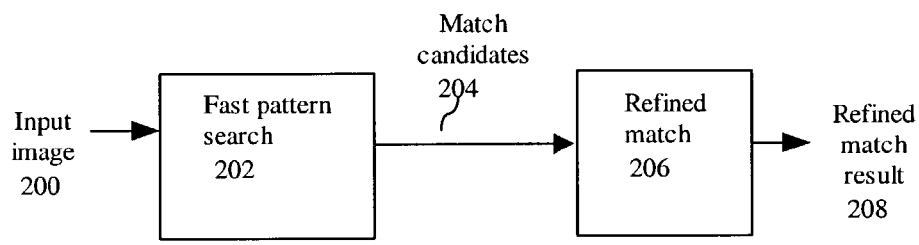
FIG. 2 shows fast pattern search and refinement processing flow.

In another embodiment of the invention, the fast pattern search is followed by a refined match step. This process is shown in FIG. 2. The input image 200 is first processed by a fast pattern search step 202 to identify match candidates 204. The match candidates or regions around match candidates are further processed by a refined match step 206 to generate a refined match result 208. The refined match step 206 performs two-dimensional pattern matching around the location, rotation, scale and aspect ratio identified by the fast pattern search 202. To achieve sub-pixel match accuracy, a fitting of a match function around good match locations for sub-pixel accuracy is performed. In one embodiment of the invention, a least square polynomial fitting is conducted on the matching functions around the neighborhood of good match locations. The location of relative maxima can be determined from the fitting parameters. Detailed implementation of fitting and relative maxima determination is described in Haralick, R M and Shapiro L G, "Computer and Robot Vision", Vol. 1, Addison-Wesley, 1992, PP. 371–380.

II. Accumulation Transformation

Given an input image, the accumulation transformation accumulates the image values along one or multiple directions. For each projection profile, one single accumulation image is used for the construction. Multiple single accumulation images of different directions can be generated for the construction of multiple projection profiles, each corresponding to a single accumulation image.

To explain the concept of the invention, the generation of a single accumulation image along the Y direction is described.

Let the accumulation in Y direction be $A_Y[x][1]=I[x][1]$ for all x and $A_Y[x][y]=A_Y[x][y-1]+I[x][y]$.

Where I[x][y] is the pixel value of the input image at position [x][y] and $A_y[x][y]$ is the pixel value of the Y direction accumulation image at position [x][y]. Here, we assume pixel y index starts from 1.

Similarly, the accumulation in X direction is $A_X[1][y]=I[1][y]$ for all y and $A_X[x][y]=A_x[x-1][y]+I[x][y]$.

Where $A_x[x][y]$ is the pixel value of the X direction accumulation image at position [x][y]. Here, we assume pixel x index starts from 1.

Those skilled in the art should recognize that the accumulation transformation could be performed along other directions such as diagonal or arbitrary angles. It could also be easily generalized to higher dimensions. For example, an accumulation along Z direction can be constructed by $A_Z[x][y][1]=I[x][y][1]$ for all z and $A_Z[x][y][z]=A_Z[x][y][z-1]+I[x][y][z]$.

Where $A_Z[x][y][z]$ is the pixel value of the Z direction accumulation image at position [x][y][z]. Here, we assume pixel z index starts from 1.

III. Projection Profile Construction

III.1 Standard Method

Each point of the projection profile of an image region for the projection along a given direction is calculated by adding the values of all pixels that are projected into the point along the given direction. The projection profile for the Y projection direction can be computed by the following formula:

$$P[x] = \sum_y I[x][y] \text{ for all } x.$$

Similarly, the projection profile for the X projection direction can be computed by the following formula:

$$P[y] = \sum_x I[x][y] \text{ for all } y.$$

Figure 3:
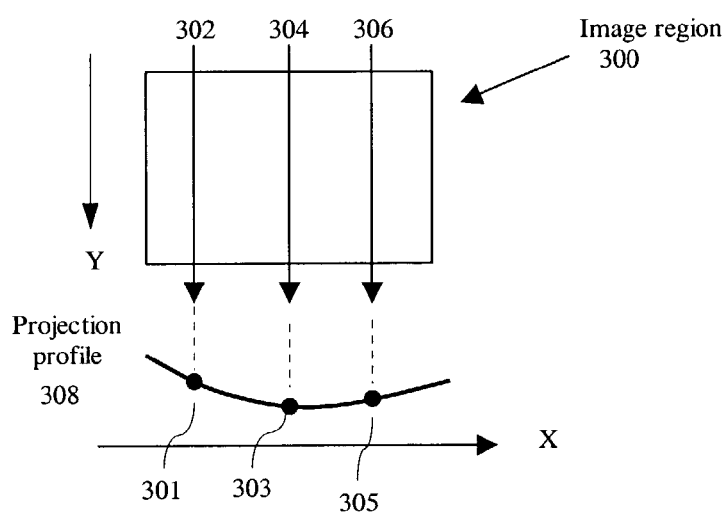
FIG. 3 shows a vertical projection profile constructed by adding values of all pixels along the vertical line in the image region.

FIG. 3 illustrates an example of projection along the vertical (Y) direction. From an image region 300 the pixels along a constant x positions 302, 304, . . . 306 are added progressively across the entire image region to accumulate values 301, 303, . . . 305 respectively. When all X value pixels contained in the image region 300 are summed in their respective Y direction, a projection profile 308 is determined.

III.2 Construction From Accumulation Image

In the standard computation formula, the projection profiles have to be computed by adding pixel values for each candidate region of the image to be searched. This is computationally inefficient. This invention derives the projection profiles from the pre-computed accumulation image. One accumulation image of a given direction can be used to derive the projection profiles of the direction for any regions in the image. This significantly improves the efficiency of the pattern search process. The projection profile value can be derived by a subtraction of two points in the corresponding accumulation image. In the following, we illustrate Y projection profile construction around a region between $y=k_1$ and $y=k_2$ by the following rule:

$$P_{(k_1,k_2)}[x]=A_Y[x][k_2]-A_Y[x][k_1-1] \text{ for all } x.$$

Figure 4:
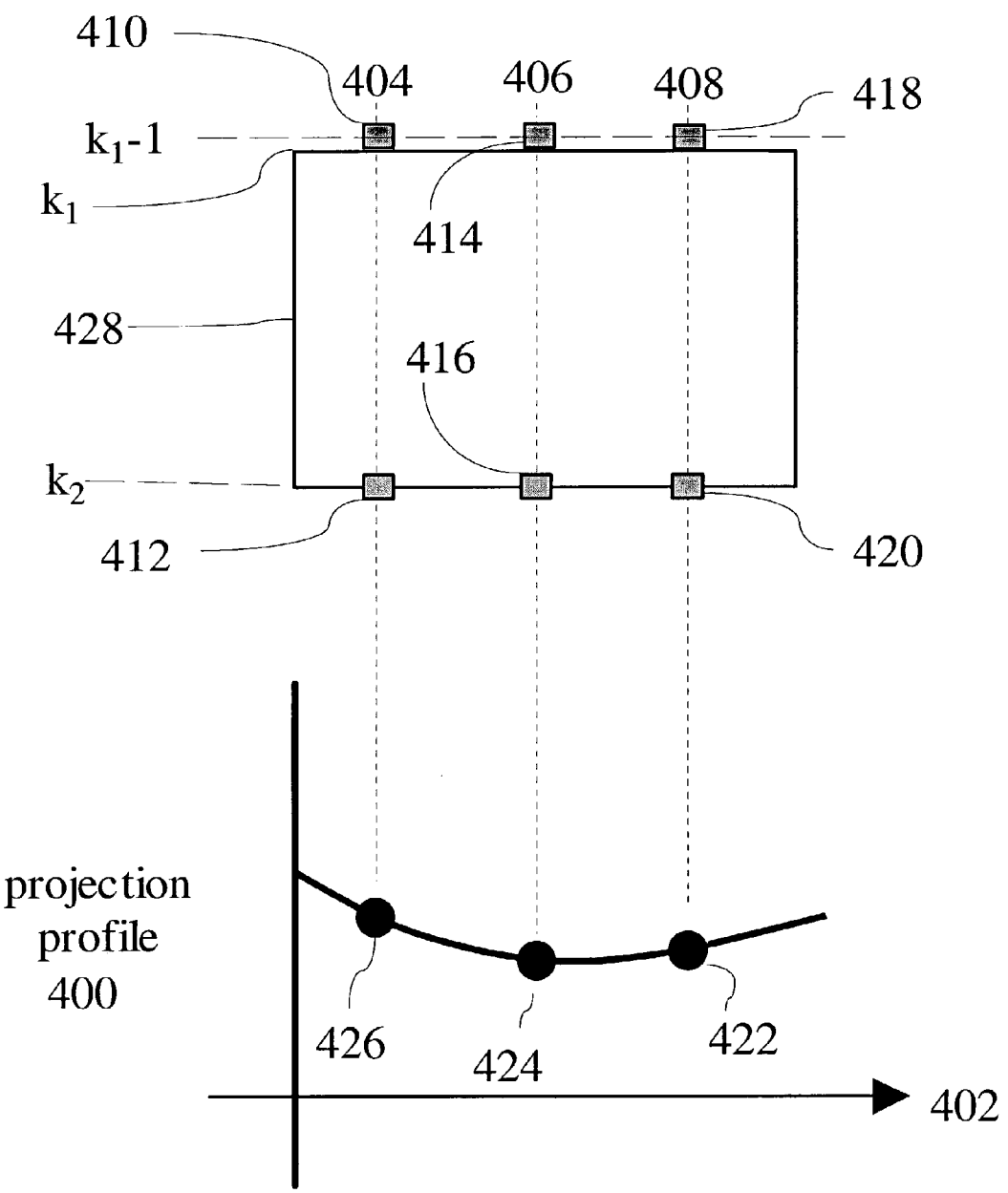
FIG. 4 shows a vertical projection profile constructed by taking the difference of two points in the accumulation image.

FIG. 4 illustrates the projection profile construction method of the invention that constructs profiles by taking the difference of two points in the accumulation image. In the accumulation image region 428, the projection profile 400 is computed along directions shown as 404, 406, . . . 408 which are orthogonal to the projection axis 402 by subtracting the accumulation image value 410 from 412 to determine 426; subtracting the accumulation image value 414 from 416 to determine 424; and subtracting 418 from 420 to determine 422 and so forth for every column in the accumulation image region 428. The accumulation image direction corresponds with the projection profile desired. Thus the vertical direction shown in FIG. 4 corresponds to the projection profile taken in the direction in which the accumulation image was originally computed.

Those skilled in the art should recognize that the method of this invention could be applied to projection of any angle. Furthermore, it can be generalized into multi-dimensional or color images.

III.3 Projection Profile Construction for Arbitrary Shape Region

When a searched pattern has arbitrary shape, the projection should be applied to regions of similar shapes. The accumulation image based projection profile construction method of this invention can also be applied to regions of arbitrary shape. In this case, the projection profile value is derived by a subtraction of two points in the corresponding accumulation image. However, the locations of the two points to be subtracted are functions of the points in the projection profile. That is, the values $k_1$ and $k_2$ in the Y projection profile construction example of the previous section are now functions of x (x is a position along the projection axis 514). In this embodiment, the projection profile construction is accomplished by the following rule:

$$P_{(k_1(x),k_2(x))}[x]=A_Y[x][k_2(x)]-A_Y[x][k_1(x)-1] \text{ for each } x.$$

Note that the starting and ending points, $k_1(x)$ and $k_2(x)$, of the region to perform projection could be different for different x values (or projection points) within the region.

Figure 5:
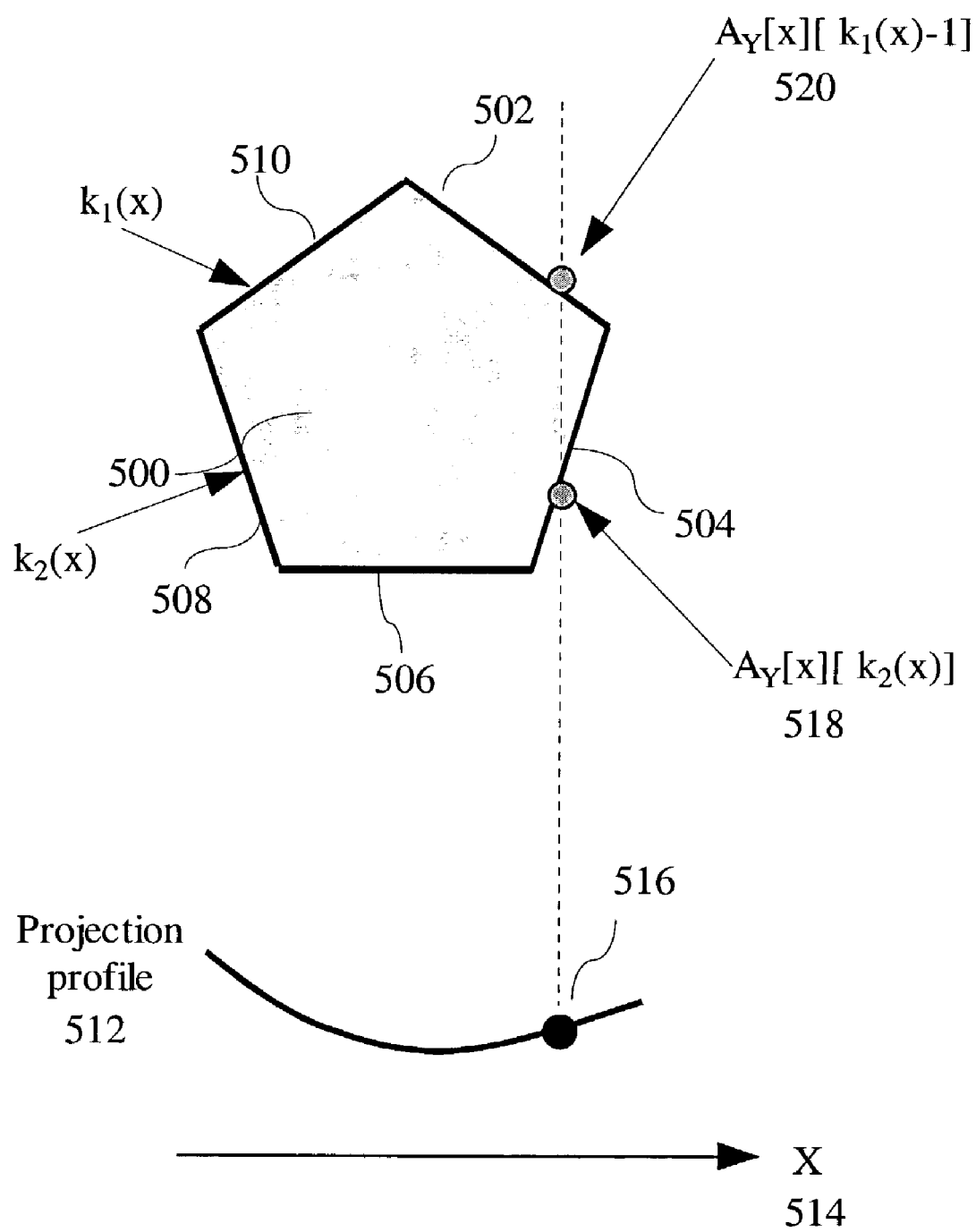
FIG. 5 illustrates the projection profile construction method of the invention for a non-rectangular shape region.

FIG. 5 illustrates the projection profile construction method of the invention for a non-rectangular shape region. Region 500 has shape determined by boundaries 510, 508, 506, 504, and 502. Values on projection profile 512 such as 516 are determined by subtracting corresponding accumulation image value 520 from 518. As shown in FIG. 5, $k_1(x)$ and $k_2(x)$ are not constant; rather they are functions of x. In one embodiment of the invention, $k_1(x)$ and $k_2(x)$ are stored in a lookup table. For each x value, $k_1(x)$ and $k_2(x)$ can be determined from the lookup table. Afterwards, the projection profile construction can be accomplished by taking the difference of two points in the accumulation image wherein the two point locations are determined by the $k_1(x)$ and $k_2(x)$ values of the given x.

Those skilled in the art should recognize that the arbitrary shape region projection profile construction method of this invention could be applied to projections of any angle. Furthermore, it can be generalized into multi-dimensional or color images or structured data that is not an image, but can be treated like an image to search for patterns.

IV. Fast Match

To perform fast pattern search, one or multiple projection directions are selected for fast match. For each projection direction, the projection profile of the template pattern is generated and stored in the learning phase. The projection profiles for the template region centered at each valid point of the input image are generated using the projection profile construction method described in the section III. The template pattern profile and the projection profile of each of the candidate regions are compared by a match function.

Figure 6A:
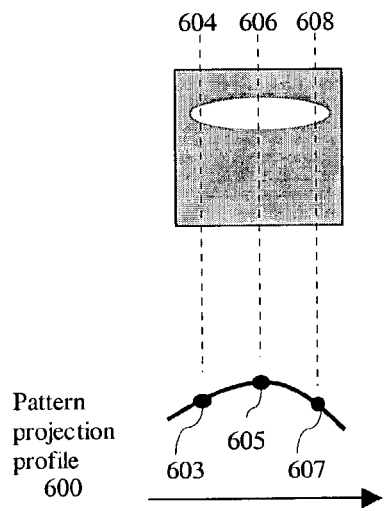
FIG. 6A shows an example pattern projection profile.
Figure 6B:
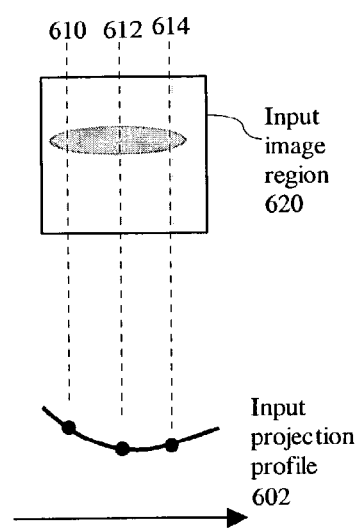
FIG. 6B shows an example image input projection profile.

FIG. 6 illustrates the projection profile match process. FIG. 6A shows an example template image having projection profile 600 determined by summation of template pixel values vertically along directions indicated by 604, 606, . . . 608 to determine projection values 603, 605, . . . 607 respectively. FIG. 6B shows an input image region (having a different pattern than the template in this pictorial example and therefore a different projection profile) and whose projection profile 602 is determined from the image along directions 610, 612, . . . 614 corresponding to directions 604, 606, . . . 608 in the template projection. A match function compares the projection profile of the template 600 with the projection profile 602 from the input image region 620 to determine a match result.

Figure 7A:
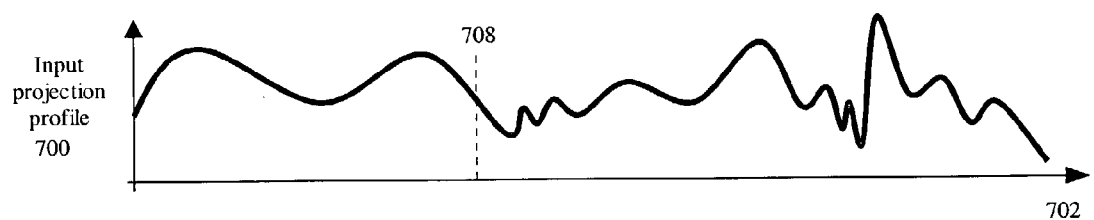
FIG. 7A shows an input projection profile.
Figure 7B:
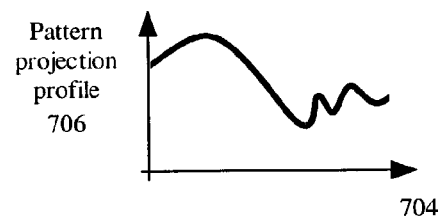
FIG. 7B shows a pattern projection profile.

For a template pattern, the vertical and horizontal projection profiles for all search locations in the input image can be pre-calculated as images. One image would consist of the horizontal projection profile result for every position of the template pattern; another image would consist of the vertical projection profile result for every position of the template pattern. The new images can be derived from the corresponding accumulation images. Each pattern projection profile is matched against each line of the corresponding input projection image by sliding the pattern profile position along each line of the input projection image and computing a match result for each position in the image. The match result data is stored for each match position to create a match result image. This process is illustrated in FIG. 7A and FIG. 7B. For a complete pattern search, the match data results in an image whose pixel values correspond to the match scores of the match centered at each pixel position. In the case of the vertical projection, the matching process slides through horizontal lines. In the case of horizontal projection, the matching process slides through vertical lines. FIG. 7A shows an input projection profile 700 for a line in direction 702. FIG. 7B shows a pattern projection profile 706 where the projection direction 704 is the same as the input projection profile direction 702. The pattern projection profile 706 is slid along the direction 702 beginning at one side and working progressively in the 702 direction with match scores computed for each location and recorded to form one line of the match image. In the example, a high match score would be expected near position 708.

V. Match Selection

Figure 8:
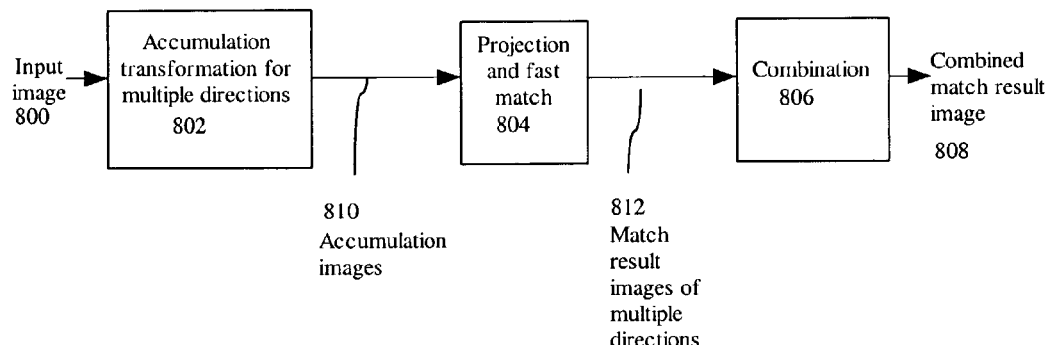
FIG. 8 shows the processing flow for the combination of match result images from multiple directions to generate a combined match result image.

The match selection process finds good matches using the match data generated from the fast match. Multiple projections could be involved. Each generates a match result image. The match result images of different projection directions are combined to create a combined match result image. The combination processing flow is shown in FIG. 8. An input image 800 is received and a plurality of accumulation transformations 802 are performed, each corresponding with a projection direction of the pattern, to produce accumulation images 810. Using the accumulation images 810, projection images are created and fast matching 804 is determined to produce match result images 812 corresponding to the projection directions. The multiple images are combined 806 to create a single combined match result image 808. In one embodiment of the invention, a weighted average of the match result images creates a combined match result image. In another embodiment of the invention, the maximum value of each pixel among the match result images is used to create a combined match result image. In yet another embodiment of the invention, the minimum value of each pixel among the match result images is used to create a combined match result image. Those skilled in the art should recognize that other image combination methods could be used for combined match result image generation.

In one embodiment of the invention, the good match locations are the locations having top ranked values in the combined match result image. In another embodiment of the invention, the good match locations are the locations whose values in the combined match result image are greater than a threshold. In yet another embodiment of the invention, the good match locations are the locations in the combined match result image whose values are greater than a threshold and are therefore top ranked. Those skilled in the art should recognize that other methods of match selection could be performed.

To achieve sub-pixel match accuracy, a fitting of match values around good match locations can be performed to create a refined match result at each good match location.

In one embodiment of the invention, a least square polynomial fitting is conducted on the matching scores around the neighborhood of good match locations. The location of relative maxima can then be determined from the fitting parameters. Detailed implementation of fitting and relative maxima determination is described in Haralick, R M and Shapiro L G, "Computer and Robot Vision", Vol. 1, Addison-Wesley, 1992, PP. 371–380.

Those skilled in the art should recognize that other models and methods of fitting can be used for parametric representation and match function and sub-pixel best match location determination. For example, Spline functions rather than polynomials could be used.

Different match functions can be used such as cross correlation, normalized correlation, normalized covariance, etc. In the following, we discuss the implementation of different match functions for fast match and match selection. Note that the match functions are applied to one-dimensional projection profiles.

V.1 Cross Correlation

For fast match, simple cross correlation can be applied. The cross correlation of the projection profiles between a pattern and a target region is calculated $$CC(i) = \sum_{j \in Profile_{pattern}} Profile_{pattern}[j] * Profile_{Input}[i][j]$$

Where $Profile_{input}[i][j]$ designates the profile value in the input profile image at position $(i,j)$.

V.2 Cross Correlation with Area Normalization

When multiple patterns or patterns of different scale, aspect ratio, or rotation are involved, cross correlation with area normalization yields robust results. For efficiency, un-normalized cross correlation is first applied to each pattern and variations of patterns. The good match locations and their cross-correlation results can then be determined for each pattern and variations of patterns. The match results for the good match locations of a pattern are then divided by the number of pixels in the pattern to create area normalized matching results. The area normalized matching results of different patterns and variations of patterns are then compared to select the pattern, scale, rotation, and aspect ratio that yield top ranked area normalized matching results.

V.3 Normalized Correlation

Normalized correlation is defined as:

$$\text{Normalized\_correlation (Input, Pattern)} = \frac{\mu(\text{Input} * \text{Pattern}) - \mu(\text{Input})\mu(\text{Pattern})}{\mu(\text{Pattern}) * \sigma(\text{Input})}$$

Normalized correlation is useful for fine discrimination between the matches and when multiple patterns or patterns of different scale, aspect ratio, or rotation are involved. Since the patterns are not input image dependent, $\mu(\text{Pattern})$ and $\sigma(\text{Pattern})$ can be pre-computed using the mean and standard deviation formula as follows:

$$\mu(\text{Pattern}) = \frac{\sum_{i \in Profile} \text{Pattern}[i]}{\sum_{i \in Profile} 1}$$

$$\sigma(\text{Pattern}) = \sqrt{\frac{\sum_{i \in Profile} [\text{Pattern}[i] - \mu(\text{Pattern})]^2}{\sum_{i \in Profile} 1 + 1}}$$

If the number of pixels in the pattern is N, the values $\mu(\text{Input}*\text{Pattern})$ and $\mu(\text{Input})$ at a profile centered at position i is computed by $$\mu(\text{Input} * \text{Pattern})[i] = \frac{CC(i)}{N} \text{ and}$$

$$\mu(\text{Input})[i] = \frac{\text{Sum}(\text{Input})[i]}{N}$$

Where $$\text{Sum(Input)}[i] = \sum_{j \in \text{Profile}(i)} (\text{Input})[j]$$

In one embodiment of the invention, Sum(Input)[i] is calculated by a recursive method to improve efficiency: Let profile(i) includes points from i−b to i+a. The recursive formula can be described as:

Sum(Input)[i]=Sum(Input)[i−1]+Input[i+a]−Input[i−b−1]

To compute σ(Input), a squared image is created. The squared image is an image whose pixel values are the square values of the corresponding pixels in the input image. The accumulation transformation is applied to the squared image to create a squared accumulation image. The square projection profiles can be generated from the squared accumulation image. They can then be used to generate $$\text{Sum(Square\_Input)}[i] = \sum_{j \in \text{Profile}(i)} \text{Square\_Input}[j]$$

Where Square_Input[j] is the $j^{th}$ point in the projection profile of the squared image within the region defined by the current pattern search. σ(Input)[i] is derived by the formula $$\sigma(\text{Input})[i] = \sqrt{\frac{\text{Sum(Square\_Input)}[j]}{N} - \mu^2(\text{Input})[i]}$$

To achieve efficient results, un-normalized cross correlation is first applied for each pattern and variations of patterns. The good match locations are then determined for each pattern and variations of patterns. Normalized correlation is then applied only to the good match locations of the patterns. The normalized correlation results of different patterns and variations of patterns are compared to select the pattern, scale, rotation, and aspect ratio that yield top ranked normalized correlation results.

Those skilled in the art should recognize that other match functions such as normalized covariance could be implemented efficiently using the accumulation transformation and projection profile construction methods of this invention.

VI. Scale and Aspect Ratio Invariant Pattern Search

Scale and aspect ratio invariant pattern search can be accomplished by constructing projection profiles of different scales and aspect ratios using the same accumulation image. Different accumulation transformation steps are not required for different scales or aspect ratios.

Figure 9:
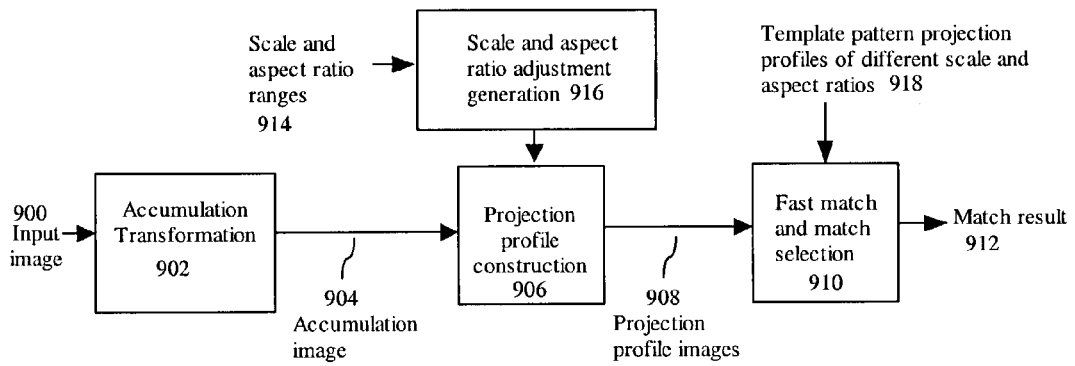
FIG. 9 shows fast scale and aspect ratio invariant pattern search processing flow.

FIG. 9 shows a fast scale and aspect ratio invariant template search processing flow. An input image 900 is received and accumulation transformed 902 to create accumulation image 904. A scale and aspect ratio adjustment generation step 916 receives the valid scale and aspect ratio ranges 914 and generates a list of pattern sizes and/or aspect ratio ranges. A projection profile construction process 906 is applied to the accumulation image 904 to generate projection profile images 908 corresponding to each of the pattern sizes and/or aspect ratio ranges. The projection profile images are processed by the fast match and match selection step 910 that uses template pattern projection profiles of different scale and aspect ratios 918 to select the good match position, scale, and aspect ratio and determine a match score and match position as the match result output 912.

VII. Rotation Invariant Pattern Search

To support rotation invariance, the accumulation transformation can be performed for different rotation angles. Alternatively, the same accumulation transformation can be applied to different rotated input images within the expected range of rotation. Since the accumulation transformation only needs to be performed once for each angle, this represent significant saving compared to the prior art approach that searches rotation of each of the separate regions of the image.

Figure 10:
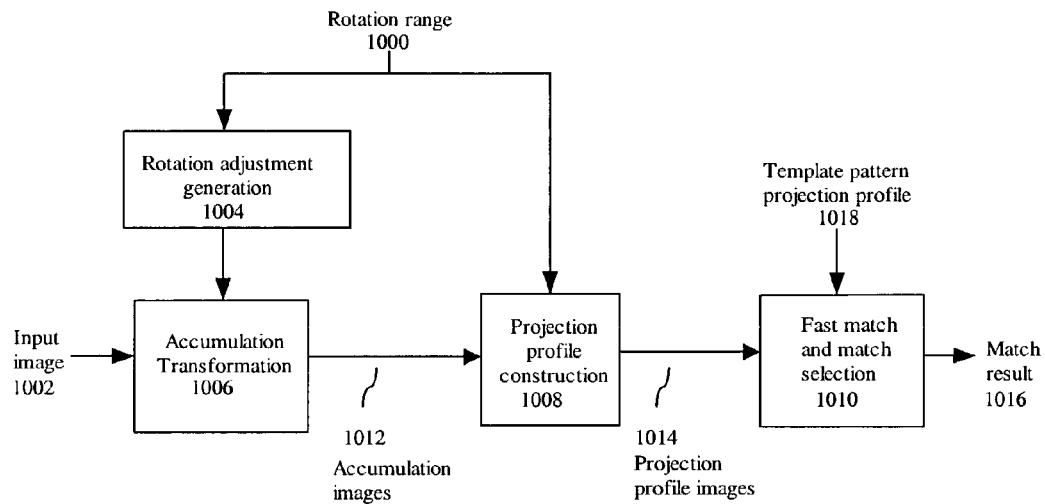
FIG. 10 shows fast rotation invariant template search processing flow.

FIG. 10 shows the fast rotation invariant template search processing flow. A rotation adjustment generation step 1004 receives a rotation range 1000 and generates a set of rotation angles. An input image 1002 is transformed 1006 in accordance with the rotation angles to produce accumulation images 1012. In one embodiment of the invention, the input image is rotated by each rotation angle and then the accumulation transformation is applied. In another embodiment of the invention, the accumulation transformation is applied to the un-rotated input image yet the accumulation directions are rotated for each rotation angle. This results in a set of accumulation images. The accumulation images are used to construct projection profiles 1008, so to produce projection profile images 1014. The projection profile construction process is applied to each accumulation image. This results in a set of projection profile result images. These images are processed by the fast match and match selection step 1010 using the template pattern projection profile 1018 to determine the match score and select the good match position and rotation to create a match result 1016.

In another embodiment of the invention, the template pattern can be rotated and the template pattern projection profile 1018 can be obtained on this rotated template pattern image instead of rotation adjustment generation step 1004.

VII. Rotation, Scale and Aspect Ratio Invariant Pattern Search

Rotation, scale and aspect ratio invariant pattern search can be accomplished by combining the scale and aspect ratio invariant pattern search method and the rotation invariant pattern search method.

Figure 11:
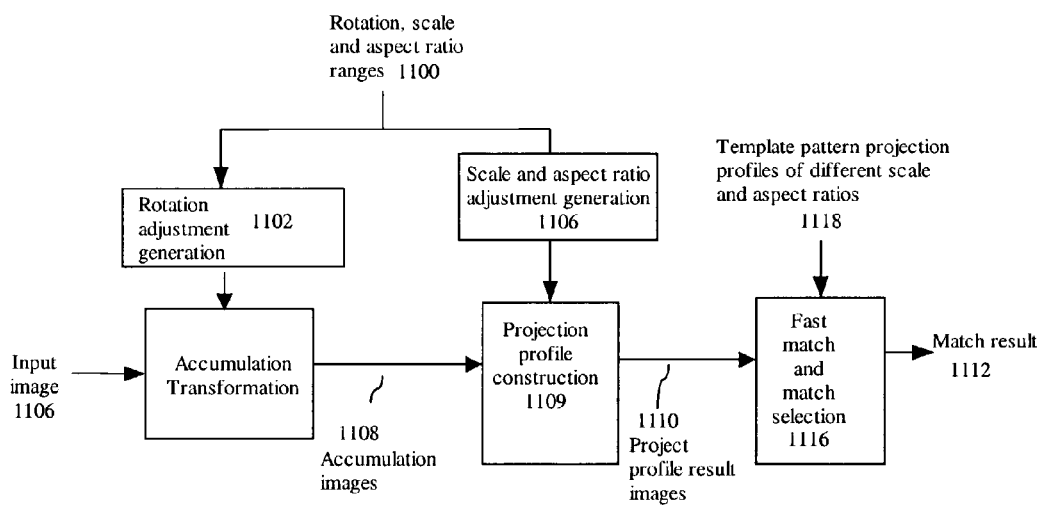
FIG. 11 shows fast rotation, scale, and aspect ratio invariant template search processing flow.

As shown in FIG. 11, an input image 1106 is received. A set of rotation, scale and aspect ration ranges 1100 is received. The rotation invariant pattern search method generates a set of accumulation images 1108 for different rotation angles and the scale and aspect ratio adjustment generation step 1106 generates a set of projection profile result images 1110 by a projection profile construction step 1109. The fast match and match selection step 1116 searches through different angles, scales and aspect ratios using the template pattern projection profiles 1118 to determine the good match, position, scale, aspect ratio, and rotation angle as the match result output 1112.

The invention has been described herein in considerable detail in order to comply with the Patent Statutes and to provide those skilled in the art with the information needed to apply the novel principles and to construct and use such specialized components as are required. However, it is to be understood that the inventions can be carried out by specifically different equipment and devices, and that various modifications, both as to the equipment details and operating procedures, can be accomplished without departing from the scope of the invention itself.

What is claimed is:

1. A fast projection profile construction method comprising the steps of:
   a) Inputting at least one image;
   b) Performing accumulation transformation of the input image to produce at least one accumulation image output;
   c) Using the at least one accumulation image, perform projection profile construction to produce at least one projection profile output wherein the projection profile construction step constructs at least one profile for an arbitrary shape region wherein the projection profile construction step for at least one arbitrary shape region uses starting and ending points in the accumulation image whose location corresponds to the border of the arbitrary shaped region to determine projection point values.

2. The method of claim 1 wherein the starting and ending point locations are stored in a lookup table.

3. A fast projection profile construction method comprising the steps of:
   a) Inputting at least one image;
   b) Performing accumulation transformation of the input image to produce at least one accumulation image output;
   c) Using the at least one accumulation image, perform projection profile construction to produce at least one projection profile output wherein the projection profile construction step constructs at least one profile for an arbitrary shape region; and
   d) Performing a scale and aspect ratio adjustment generation step and a rotation adjustment generation step having a plurality of accumulation image outputs and a plurality of projection profile image outputs for rotation, scale and aspect ratio invariant pattern search.

4. A fast pattern search method comprising the steps of:
   a) Inputting an image;
   b) Inputting at least one template pattern projection profile;
   c) Performing at least one accumulation transformation using the input image to produce at least one accumulation image output;
   d) Performing projection profile construction using the at least one accumulation image to generate at least one projection profile image;
   e) Using the at least one projection profile image and the at least one template pattern projection profile, perform fast matching to produce a match data output; and
   f) Performing a rotation adjustment generation step to guide accumulation transformation having a set of accumulation image outputs for rotation invariant pattern search.

5. A fast pattern search method comprising the steps of:
   a) Inputting an image;
   b) Inputting at least one template pattern projection profile;
   c) Performing at least one accumulation transformation using the input image to produce at least one accumulation image output;
   d) Performing projection profile construction using the at least one accumulation image to generate at least on projection profile image;
   e) Using the at least one projection profile image and the at least one template pattern projection profile, perform fast matching to produce a match data output; and
   f) Performing a scale and aspect ratio adjustment generation step having a plurality of projection profile image outputs for scale and aspect ratio invariant pattern search.

6. A fast pattern search method comprising the steps of:
   a) Inputting an image;
   b) Inputting at least one template pattern projection profile;
   c) Performing at least one accumulation transformation using the input image to produce at least one accumulation image output;
   d) Performing projection profile construction using the at least one accumulation image to generate at least one projection profile image wherein the projection profile construction step constructs profiles for an arbitrary shape region wherein the projection profile construction step for an arbitrary shape region uses starting and ending points in the accumulation image whose location corresponds to the border of the arbitrary shaped region to determine projection point values;
   e) Using the at least one projection profile image and the at least one template pattern projection profile, perform fast matching to produce a match data output.

7. A fast pattern search method comprising the steps of:
   a) Inputting an image;
   b) Inputting at least one template pattern projection profile;
   c) Performing at least one accumulation transformation using the input image to produce at least one accumulation image output;
   d) Performing projection profile construction using the at least one accumulation image to generate at least one projection profile image;
   e) Using the at least one projection profile image and the at least one template pattern projection profile, perform fast matching to produce a match data output; and
   f) Performing a match selection step using the match data to produce a match result output wherein the match selection step performs fitting of match scores around good match locations for sub-pixel accuracy.

8. A fast pattern search method comprising the steps of:
   a) Inputting an image;
   b) Inputting at least one template pattern projection profile;
   c) Performing at least one accumulation transformation using the input image to produce at least one accumulation image output;
   d) Performing projection profile construction using the at least one accumulation image to generate at least one projection profile image;
   e) Using the at least one projection profile image and the at least one template pattern projection profile, perform fast matching to produce a match data output; and
   f) Performing a match selection step using the match data to produce a match result output wherein the match selection step comprises normalized correlation as the match function wherein the normalized correlation step generates uses a squared accumulation image.

9. A fast pattern search method comprising the steps of:
   a) Inputting an image;
   b) Inputting at least one template pattern projection profile;
   c) Performing an accumulation transformation of the input image to create at least one accumulation image output;

d) Performing projection profile construction using the at least one accumulation image and generate at least one projcetion profile;
e) Performing fast matching using the at least one projection profile and the at least one template pattern projection profile;
f) Performing match selection to create a match result output; and
g) Performing a rotation adjustment generation step to guide accumulation transformation of the input image to create a plurality of accumulation image outputs for rotation invariant pattern search.

10. A fast pattern search method comprising the steps of:
a) Inputting an image;
b) Inputting at least one template pattern projection profile;
c) Performing an accumulation transformation of the input image to create at least one accumulation image output;
d) Performing projection profile construction using the at least one accumulation image and generate at least one projection profile;
e) Performing fast matching using the at least one projection profile and the at least one template pattern projection profile;
f) Performing a match selection to create a match result output;
g) Performing a scale and aspect ratio adjustment generation step to create a set of projection profile image outputs for scale and aspect ratio invariant pattern searching.

* * * * *